United States Patent
Lou et al.

(10) Patent No.: US 7,639,600 B1
(45) Date of Patent: Dec. 29, 2009

(54) LOW COMPLEXITY CHANNEL ESTIMATION FOR ORTHOGONAL FREQUENCY DIVISION MODULATION SYSTEMS

(75) Inventors: Hui-Ling Lou, Palo Alto, CA (US); Kok-Wui Cheong, San Jose, CA (US)

(73) Assignee: Marvell International Ltd., Hamilton (BM)

( * ) Notice: Subject to any disclaimer, the term of this patent is extended or adjusted under 35 U.S.C. 154(b) by 1196 days.

(21) Appl. No.: 10/647,163

(22) Filed: Aug. 21, 2003

Related U.S. Application Data (60) Provisional application No. 60/446,795, filed on Feb. 12, 2003.

(51) Int. Cl.
*H04J 11/00* (2006.01)
*H04B 17/02* (2006.01)
*H03K 9/00* (2006.01)

(52) U.S. Cl. .................. 370/208; 455/134; 375/316
(58) Field of Classification Search .................. 370/203, 370/210, 208, 342, 320, 328, 441, 274, 202, 370/212, 215, 335; 375/241, 262, 240.28, 375/347, 260, 341, 267, 210, 316, 428
See application file for complete search history.

(56) References Cited

U.S. PATENT DOCUMENTS

| | | | |
|---|---|---|---|
| 5,432,816 A * | 7/1995 | Gozzo ....................... 375/232 |
| 6,327,314 B1 | 12/2001 | Cimini, Jr. et al. |
| 6,442,129 B1 | 8/2002 | Yonge, III et al. |
| 6,473,393 B1 | 10/2002 | Ariyavisitakul et al. |
| 6,650,616 B2 * | 11/2003 | Crawford .................... 370/203 |
| 6,771,591 B1 * | 8/2004 | Belotserkovsky et al. ... 370/210 |
| 6,892,075 B2 * | 5/2005 | Ojard et al. .................. 455/504 |
| 6,996,195 B2 * | 2/2006 | Kadous ....................... 375/341 |
| 7,068,593 B2 * | 6/2006 | Cho et al. .................... 370/208 |
| 7,085,223 B2 * | 8/2006 | Izumi ......................... 370/204 |
| 7,099,413 B2 * | 8/2006 | Chuang et al. .............. 375/347 |
| 7,233,625 B2 * | 6/2007 | Ma et al. ..................... 375/260 |
| 2001/0036235 A1 | 11/2001 | Kadous |
| 2002/0191630 A1 | 12/2002 | Jacobsen |
| 2003/0016645 A1 | 1/2003 | Siala et al. |

FOREIGN PATENT DOCUMENTS

EP    1 178 640 A1    2/2002

OTHER PUBLICATIONS

"Part 16: Air Interface for Fixed Broadband Wireless Access Systems", IEEE Standard 802.16 (Oct. 2004); pp. 1-857.
Beek et al., "On Channel Estimation in OFDM Systems", pp. 1-5.
Lou et al., "On Low Complexity Channel Estimation for OFDM Systems", Feb. 11, 2003, pp. 1-6.
Lou et al., "On Division-Free Frequency Domain Equalization and Viterbi Decoding Using Channel State Information", Mar. 8, 2002, pp. 1-18.
IEEE, "Part 16: Air Interface for Fixed Broadband Wireless Access Systems—Medium Access Control Modifications and Additional Physical Layer Specifications for 2-11 GHz", Oct. 27, 2002, Draft Amendment to IEEE Standard for Local and Metropolitan Area Networks, pp. 1-331.
IEEE Standard, "Part 11: Wireless LAN Medium Access Control (MAC) and Physical Layer (PHY) specifications: High-speed Physical Layer in the 6 GHZ Band", IEEE 802.11a, 1999.
IEEE Standard, "Part 11: Wireless LAN Medium Access Control (MAC) and Physical Layer (PHY) specifications: Further Higher Data Rate Extension in the 2.4 GHz Band", IEEE 802.11g, 2003.

* cited by examiner

*Primary Examiner*—Hanh Nguyen (57) ABSTRACT

Low complexity channel estimation techniques for orthogonal frequency division modulation (OFDM) systems. The channel estimation techniques may be applied to IEEE 802.11a/g and 802.16 systems.

72 Claims, 6 Drawing Sheets

| Number of Updates | $\alpha$ (or $\alpha_1$) |
|---|---|
| 1 | $2^{-1}$ |
| 2 | $2^{-2}$ |
| 5 | $2^{-3}$ |
| 10 | $2^{-4}$ |
| 22 | $2^{-5}$ |
| 44 | $2^{-6}$ |
| 88 | $2^{-7}$ |
| 177 | $2^{-8}$ |
| 354 | $2^{-9}$ |
| 709 | $2^{-10}$ |
| 1419 | $2^{-11}$ |
| 2839 | $2^{-12}$ |
| 5678 | $2^{-13}$ |
| 11356 | $2^{-14}$ |

*FIG. 4*

LOW COMPLEXITY CHANNEL ESTIMATION FOR ORTHOGONAL FREQUENCY DIVISION MODULATION SYSTEMS

CROSS-REFERENCE TO RELATED APPLICATION

This application claims priority to U.S. Provisional Application Ser. No. 60/446,795, filed on Feb. 12, 2003 and entitled, "Apparatus And Method For Low Complexity Channel Estimation For OFDM Systems".

BACKGROUND

Figure 1A:
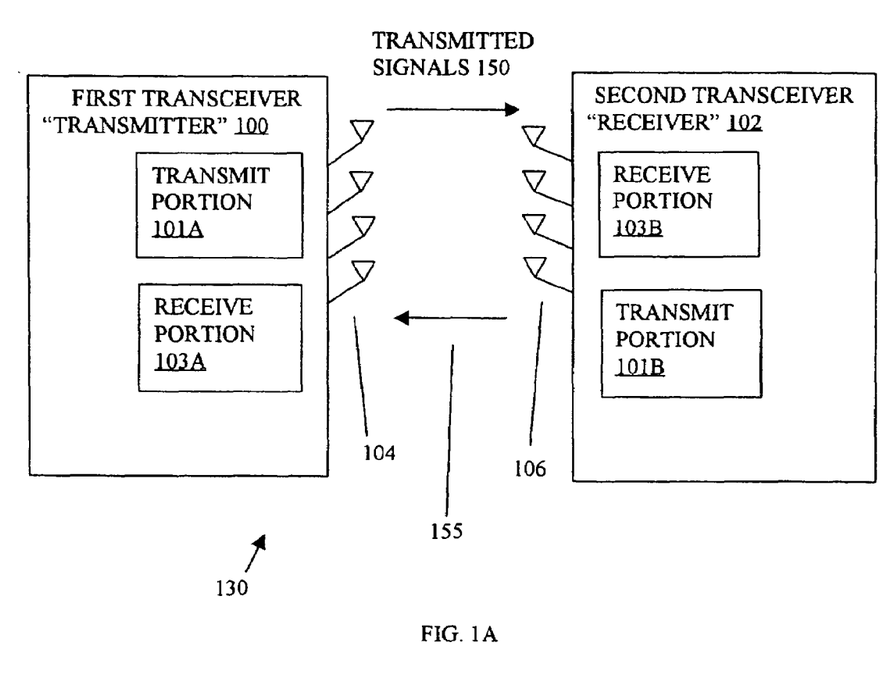
FIG. 1A illustrates a wireless communication system with a first transceiver and a second transceiver.

FIG. 1A illustrates a wireless communication system 130, which includes a first transceiver 100 and a second transceiver 102. The first transceiver 100 may be designated a "transmitter" because it first transmits signals to the second transceiver 102, which may be designated a "receiver." Both transmitter 100 and receiver 102 may transmit and receive wireless signals, as shown by the transmit portions 101A, 101B and receive portions 103A, 103B.

Orthogonal frequency division modulation (OFDM) is a modulation technique for communications which splits a data stream into multiple radio frequency channels, which are each sent over a "subcarrier" frequency.

In an OFDM baseband system, such as an IEEE 802.11a/g system, a transmitter 100 transmits two identical training sequences known as "preambles" to a receiver 102. The transmitter 100 sends these training sequences over two OFDM symbol durations. The transmitter 100 may send training subcarriers (also called "carriers" or "tones") for the training sequences that correspond to all data subcarriers to the receiver 102.

Figure 1B:
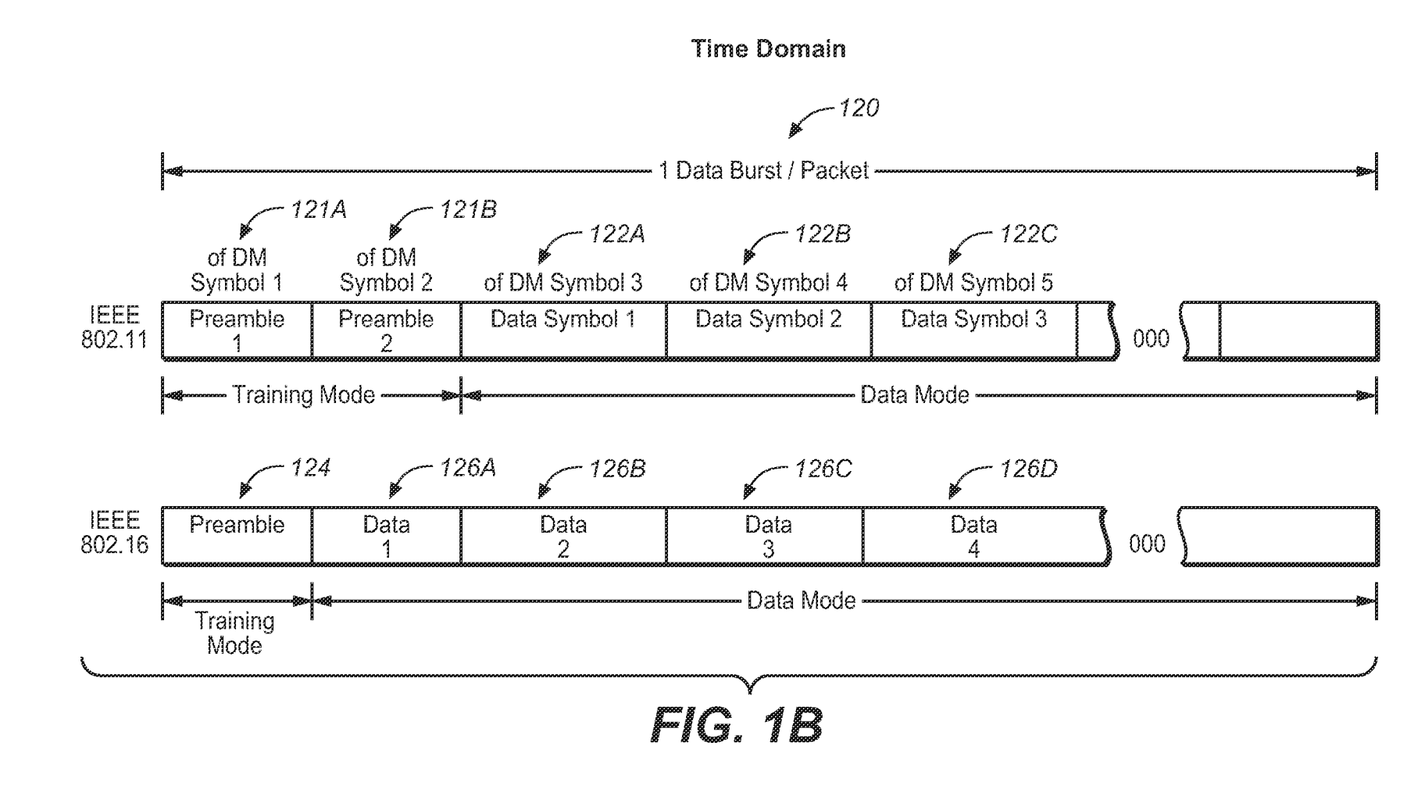
FIG. 1B illustrates an example of a data burst/packet transmitted by the transmitter to the receiver in FIG. 1A.

FIG. 1B illustrates an example of a data burst/packet 120 transmitted by the transmitter 100 to the receiver 102 in FIG. 1A. In IEEE 802.11, the packet 120 contains a preamble 121A,B in a training mode and a plurality of data symbols 122A-122C in a data mode. In IEEE 802.16a, the packet contains a preamble 124 in a training mode and a plurality of data symbols 126A-C in a data mode.

Figure 1C:
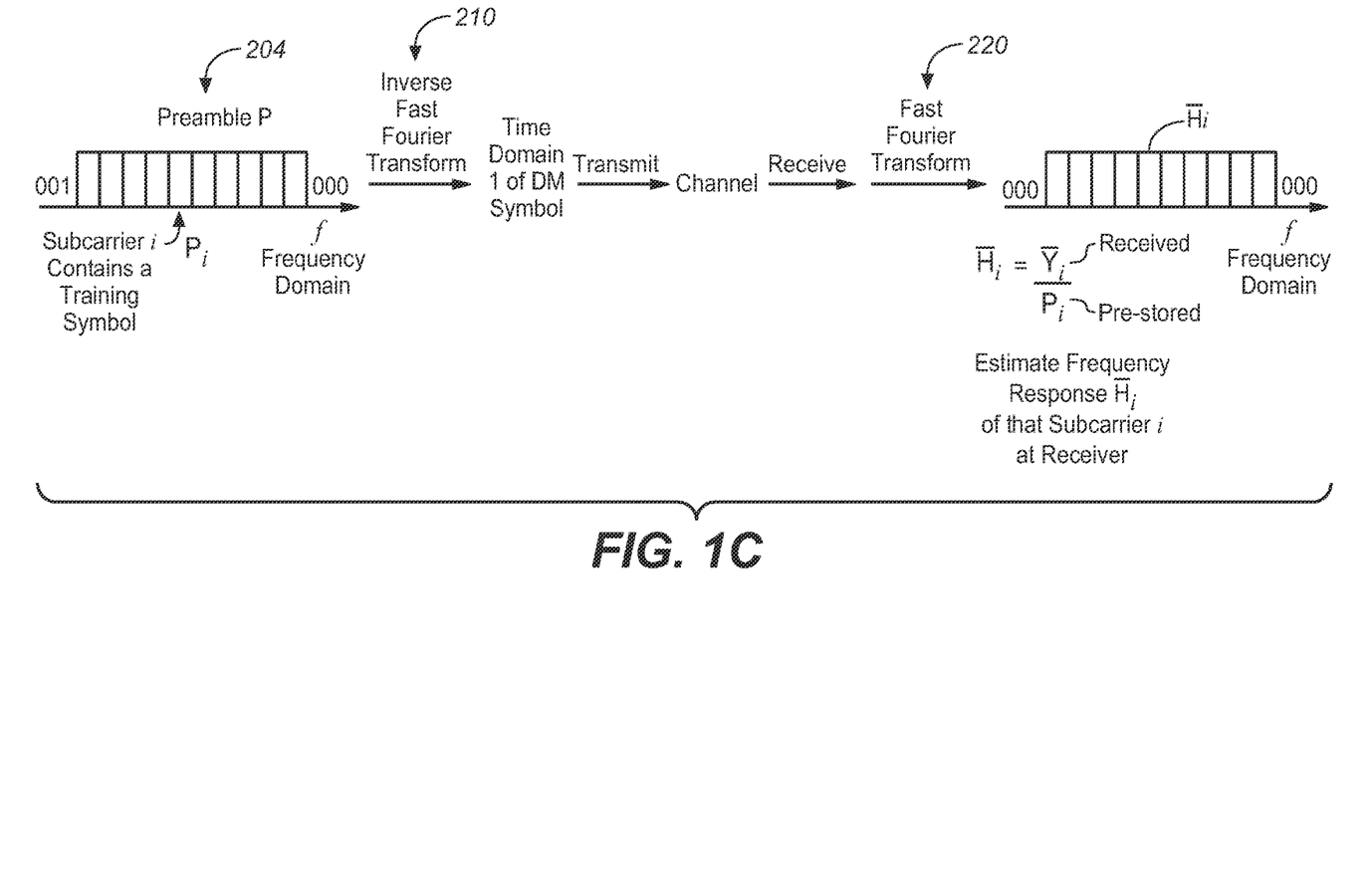
FIG. 1C illustrates a set of subcarriers for a preamble "p" at the transmitter of FIG. 1A and how the subcarriers are transformed and transmitted and how the subcarrier channels are estimated.

FIG. 1C illustrates a set of subcarriers for a preamble "P" 204 at the transmitter 100 in FIG. 1A. FIG. 1C shows how the subcarriers are transformed and transmitted to the receiver 102. A subcarrier "i" in the frequency domain contains a training symbol. The transmitter 100 performs an inverse fast Fourier transform (IFFT) to transform the subcarriers to one time-domain OFDM symbol. One OFDM symbol contains multiple training symbols carried over the sub-carriers. The transmitter 100 transmits the OFDM symbol across a channel. The receiver 102 receives the OFDM symbol and performs an FFT operation. The receiver 102 estimates a frequency response $H_i$ of the subcarrier i.

The receiver 102 typically uses two identical received training sequences/preambles to compute their correlation and obtain time and frequency information for frequency synchronization and channel estimation. The receiver 102 may compute channel estimation using a Least Square (LS) estimator. An estimated channel frequency response $\bar{H}_k$ corresponding to a subcarrier k (k is an index for subcarriers) may be expressed as:

$$\bar{H}_k = \frac{\bar{P}_k}{P_k} \text{ for } k = 0, 1 \ldots, N-1, \text{ and } P_k \neq 0, \quad (1)$$

where N denotes the total number of subcarriers of an OFDM symbol, $\bar{P}_k$ is the received symbol of the kth subcarrier, and $P_k$ is the corresponding training symbol for that kth subcarrier, which forms a part of a preamble. Equation (1) indicates that a channel estimate may be determined for each subcarrier k.

A preamble represents information about packets that follow the preamble. As such, preambles are overheads of a packet to be transmitted. There may be multiple preambles. Preambles reduce the throughput of a communication system. For a diversity system, such as a multiple-in-multiple-out (MIMO) system with multiple transmit and receive antennas 104, 106, channels between all pairs of the transmit and receive antennas 104, 106 should be estimated. Extra training overheads may be required.

It may be advantageous to minimize the number of preambles required to be transmitted while still obtaining satisfactory system performance. To increase system throughput and reduce the overhead of transmitting two identical training sequences over two OFDM symbol durations per packet, the IEEE 802.16a OFDM system proposes transmitting two identical training sequences using one preamble over one OFDM symbol duration. The receiver 102 uses the two identical sequences for correlation to obtain frequency information. To obtain two identical training sequences in the time domain over just one symbol duration, every other subcarrier in the frequency domain has to be set to zero, which is a known Fourier transform property.

SUMMARY

An IEEE 802.16a OFDM system, which uses two identical training sequences of one preamble over one OFDM symbol duration, may require more sophisticated channel estimation techniques at the receiver, compared to a system, such as IEEE 802.11a/g OFDM, where training sequences of two OFDM symbol durations are transmitted per packet. Sophisticated channel estimators, such as the Minimum Mean-Square Error (MMSE) and Least-Square (LS) estimators have been proposed. However, these estimators may be complex to implement because they require many multiplication operations. Since training symbols are sent for alternate subcarriers (i.e., $P_k=0$ in equation (1) for alternate subcarriers), interpolation techniques are used to estimate the channel response of these zeroed out subcarriers.

An "upsampling" technique may interpolate the channel response. This technique, however, requires multiple Fast Fourier transforms (FFT) computations. Furthermore, since typical OFDM systems such as IEEE 802.11a/g and IEEE 802.16a have many guard subcarriers in an OFDM symbol that are set to zero, this technique may not provide optimum performance.

Other proposed approaches use various filtering techniques to compute the interpolated points of an estimated channel response. These techniques may typically require filtering and multiplication operations.

The present application relates to a relatively low-complexity channel estimation technique for OFDM systems. The technique may use only addition operations. The technique may combine (a) linear interpolation with (b) relatively low or reduced complexity adaptive filtering to achieve a desired level of performance.

DETAILED DESCRIPTION

FIG. 1A illustrates a wireless communication system 130 with a first transceiver 100 and a second transceiver 102. The first transceiver 100 may be designated a "transmitter" because it first transmits signals to the second transceiver 102, which may be designated a "receiver." However, both transceivers 100, 102 may transmit and receive wireless signals, as shown by the transmit portions 101A, 110B and receive portions 103A, 103B. Each transceiver 100, 102 may have one or more antennas 104, 106.

FIG. 1B illustrates an example of a data burst/packet 120 transmitted by the transmitter 100 to the receiver 102 in FIG. 1A.

The transmitter 102 may send a "preamble" to the receiver 102. A preamble is an initial set of symbols sent by a transmitter for establishing frequency synchronization and channel estimation at a receiver. A "symbol" in digital transmission is a recognizable electrical state, which is associated with a "signal element" (an electrical signal within a defined period of time). For example, a signal element in binary transmission is represented as one of two possible states or symbols: 1 or 0.

FIG. 1C illustrates a set of subcarriers for a preamble "p" at the transmitter 100 and how the subcarriers are transformed, transmitted and the subcarrier channels are estimated at the receiver 102. A subcarrier (also referred to as "carrier" or "tone") is a frequency domain unit, which may contain a data, pilot, null or training symbol (i.e., a symbol with a sequence of known transmit signals used for training at the receiver).

Figure 2:
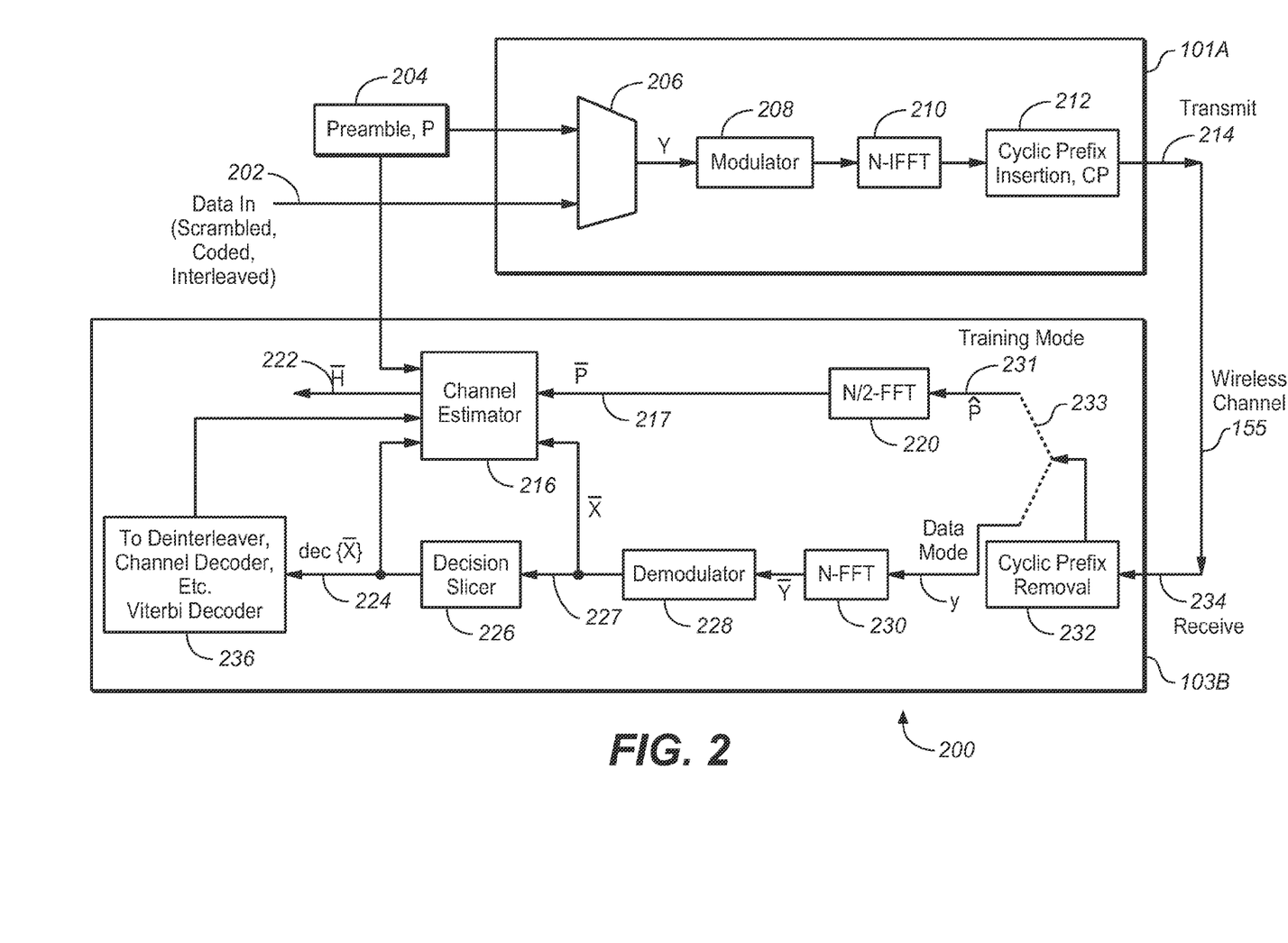
FIG. 2 illustrates a transmit portion of the first transceiver and a receive portion of the second transceiver in FIG. 1A.

FIG. 2 illustrates a transmit portion 101A in the transmitter 100 and a receive portion 103B in the receiver 102 in FIG. 1A. The transmit portion 101A includes a multiplexer 206, a modulator 208, an N-IFFT (N-point Inverse Fast Fourier Transform) module 210, and a cyclic prefix insertion module 212. The multiplexer 206 receives a preamble 204 and a "data in" stream, which may be scrambled, coded and interleaved.

In an IEEE 802.16a OFDM (Orthogonal Frequency Division Modulation) system, the preamble P 204 contains +1 or −1 in the 100 subcarriers corresponding to the 100 subcarriers that would normally carry data and pilot symbols during regular transmission. The N-IFFT module 210 performs a N-point Inverse Fast Fourier Transform. "N" represents a number of subcarriers and a number of points in the IFFT (or FFT). The cyclic prefix insertion module 212 inserts a cyclic prefix (CP). The transmit portion 101A transmits a signal 214 with the preamble across a wireless channel 155 to the receive portion 103B. Modulation by a carrier frequency is not shown for simplicity.

The receive portion 103B includes a channel estimator 216, an N/2-FFT (Fast Fourier Transform) module 220, a decision slicer 226, a demodulator 228, an N-FFT module 230, and a cyclic prefix removal module 232. The cyclic prefix removal module 232 receives a transmitted preamble and later receives data from the transmit portion 101A. The cyclic prefix removal module 232 removes a cyclic prefix, and outputs a received preamble sequence $\bar{P}$ 231 to the N/2-FFT module 220 in a training mode. In a data mode, the cyclic prefix removal module 232 removes a cyclic prefix and uses a switch 233 to output data y from a received data packet to the N-FFT module 230.

The N/2-FFT and N-FFT modules 220, 230 perform 128-point and 256-point fast Fourier transforms (when N=256), respectively. The N/2-FFT module 220 outputs a received preamble $\bar{P}$ 217 to the channel estimator 216. The N-FFT module 230 outputs a data symbol $\bar{Y}$ to the demodulator 228. The demodulator 228 outputs a demodulated data symbol $\bar{X}$ 227 to the channel estimator 216 and the decision slicer 226. The decision slicer 226 may be any type of decision maker, e.g., hard decision or decode decision.

After N/2 FFT transformation, the channel estimator 216 may recognize that +/−1 preamble P 204 was sent by the transmit portion 101A and may use the pre-stored preamble 204 to derive a channel estimate for each subcarrier. The channel estimator 216 has access to the preamble P 204, which is pre-stored in the receive portion 103B, as shown in FIG. 2. The channel estimator 216 compares the pre-stored preamble P 204 to the received and processed $\bar{P}$ 217. The pre-stored preamble P 204 and the received preamble $\bar{P}$ 217 provide initial channel estimates for the corresponding subcarrier. The channel estimator 216 outputs an estimated channel frequency response $\bar{H}$ 222 for the corresponding subcarriers. Interpolation and other techniques can be used to obtain channel estimates for the subcarriers that do not have a training symbol sent in the preamble as described later in the text.

The decision slicer 226 may be used to refine channel estimates, as described below. The decision slicer 226 may output decoded data dec$\{\bar{X}\}$ 224 to the channel estimator 216, as well as a deinterleaver, a channel decoder and other components 236.

A "training sequence" is a sequence of known transmit data in the time domain for establishing communications between a transmitter 100 and receiver 102 for a channel. To perform frequency synchronization in an IEEE 802.11a OFDM system, the transmit portion 101A transmits two repeated, identical, time domain training sequences in two preambles P 204 over two OFDM symbol durations. An OFDM symbol (FIGS. 1B-1C) in the frequency domain is made up of data subcarriers, pilot subcarriers and null subcarriers, and an OFDM symbol duration is a length of an OFDM symbol in the time domain (FIG. 1C). The number of subcarriers (FIG. 1C) determines an FFT size. The receive portion 103B computes the correlation between the two received time domain training sequences to obtain timing information, correct frequency offset, etc. The IEEE 802.16a uses one OFDM symbol duration to transmit the preambles in order to obtain a repeated sequence in the time domain with an OFDM symbol period. Training symbols are sent for "even" subcarriers only. The OFDM symbol is further described on pages 145-147 of the IEEE 802.16a draft amendment.

The portion of the preamble 204 in FIG. 2 that can be used for channel estimation may have a magnitude of 1 and pseudo random phases for "even" subcarriers. In the frequency domain, the preamble 204 may be expressed as:

$$\begin{cases} \pm 1 & \text{for } k = \pm 2, \pm 4, \ldots \pm 100 \\ 0 & \text{for } k = 0, \pm 1, \pm 3, \ldots \pm 99, \pm 101, \pm 102, \ldots, \pm 127, -128 \end{cases} \quad (2)$$

As shown, only one hundred of the two hundred non-guard subcarriers (of the total 256 subcarriers per OFDM symbol) are actually excited to be +/−1. Under IEEE 802.11a and 802.16a standards, the transmit portion 101A zeroes out the guard subcarriers, e.g., subcarriers k=−128, −127 to −101 and 101, 102 to 127 for an 802.16a system, in an OFDM symbol for pulse shaping and other purposes.

A problem is the channel estimator 216 only has information for the excited subcarriers (every other subcarrier) but needs to somehow derive the channel estimate for the zeroed out subcarriers (k=+/−1, +/−3, . . . +/−99) where a training symbol is not transmitted (for an IEEE 802.16a system, the channel estimates in the +/−101, +/−102, . . . +/−127, −128 subcarriers do not need to be computed because they are guard subcarriers and no data symbols are carried in these guard subcarriers).

An upsampling approach has been proposed to estimate the channel response of these $P_k$=0 subcarriers. The channel estimator 216 uses the determined preamble $\overline{P}$ 217 to obtain channel estimates for the even subcarriers. An N-point IFFT is done with these channel estimates back to the time domain. The result is periodic with a period of N/2. The last N/2 samples are zeroed out, and a N-point FFT is performed to obtain all the interpolated points. Interpolation with upsampling may not be accurate because the zeroed out subcarriers in the time domain, especially zeroed out subcarriers +/−101 to +/−127, −128, is similar to adding high frequency components. This may degrade performance. Upsampling is also complex because it involves multiple FFT and IFFT computations.

In an embodiment, a relatively low-complexity channel estimation technique may be used to derive an initial channel estimate with even subcarriers and use linear interpolation and reduced complexity adaptive filtering to refine the initial channel estimate.

Since the transmit portion 101A excites almost every other subcarrier, the receive portion 103B may assume that the two even subcarriers are correlated and perform a linear interpolation. The receive portion 103B examines every other subcarrier (e.g., even subcarriers up to +/−100) and estimates the intermediate (odd) value.

Figure 3:
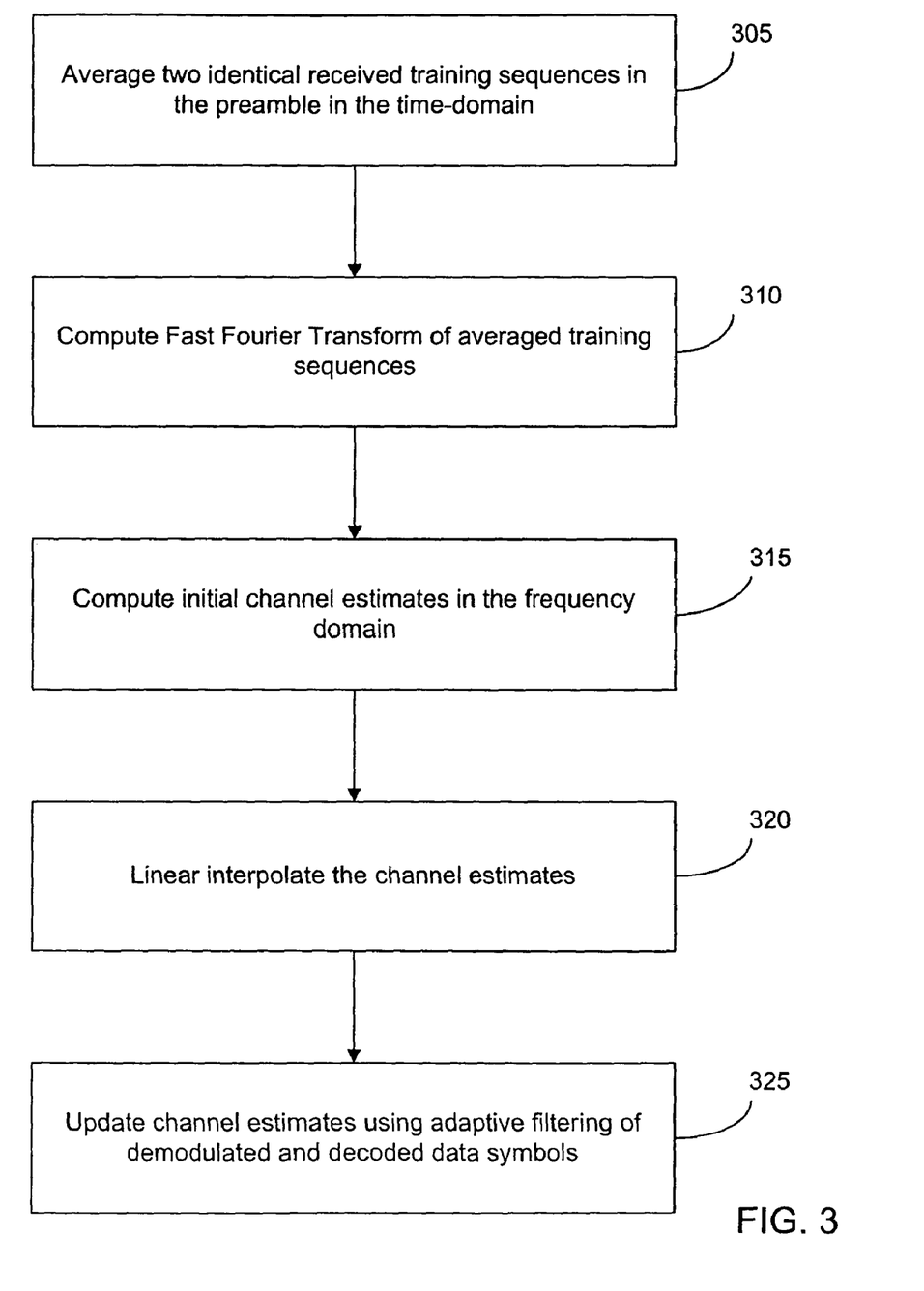
FIG. 3 illustrates a technique of using the system of FIG. 2.

FIG. 3 is a flowchart describing a channel estimate technique according to an embodiment. The N/2-FFT module 220 averages the two received, identical, repeated training sequences in the preamble $\overline{p}$ 231 in the time domain by adding the time domain samples and dividing by two (block 305). This may be expressed as:

$$\overline{p}_k = \frac{(\overline{p}_k + \overline{p}_{k+N/2})}{2} \text{ for } k = 0, 1, 2, \ldots, \frac{N}{2} - 1, \quad (3)$$

where $p_k$ is one received preamble sequence 231 in the time domain, and $\overline{p}_{k+N/2}$ is the other received preamble sequence 231 in the time domain in FIG. 2. N represents the number of subcarriers (e.g., 256) that carry the preamble. Because of additive white Gaussian noise (AWGN), an average may be derived to increase the signal-to-noise ratio (SNR) of the received training sequence.

The N/2-FFT module 220 computes a 128-point fast Fourier transform (FFT) of $\overline{p}$ to yield $\overline{P}_k$ 217 for k=0, +/−1, +/−2, . . . , +/−63, −64 (up to only 64 because the previous operation divided 128 by 2) (block 310).

The N-FFT module 230 computes a 256-point fast Fourier transform (FFT) of the data portion y of the packet to yield $\overline{Y}$. The demodulator 228 demodulates the output of the N-FFT module 230 to yield $\overline{X}$.

The channel estimator 216 computes initial channel estimates in the frequency domain for even subcarriers up to one hundred (block 315). The initial channel estimates may be denoted as $\overline{H}_{k,0}$ 222, with '0' indicating a training period (i.e., a time instance when training occurs) at time 0. A '1' indicates a next time instance when data starts. A '2' indicates a next time instance when another data packet starts. In this case, training symbols are transmitted in the even subcarriers of the preamble $P_k$ 204, as described in equation (2) for the IEEE 802.16a system example.

$$\overline{H}_{2k,0} = \frac{\overline{P}_{k,0}}{P_{2k}} \text{ for } k = \pm 1, \pm 2, \pm 3, \ldots, \pm 63, -64, \text{ and } P_{2k} \neq 0 \quad (4)$$

where 2k indicates that only even subcarriers can be estimated since training symbols are only sent over even subcarriers. The value for $\overline{P}_{k,0}$ is from the channel 155 received by the receive portion 103B, and the value for 204 is pre-stored at the receive portion 103B. Since $P_{2k} \in \{+/-1\}$ typically (for example Equation (2)), no actual division operations may be needed.

For the odd subcarriers, the channel estimator 216 linearly interpolates two derived adjacent channel estimates by adding them and dividing by two (block 320).

$$\overline{H}_{2k+1,0} = \frac{(\overline{H}_{2k,0} + \overline{H}_{2k+2,0})}{2} \text{ for } k = 0, \pm 1, \pm 2, \ldots, \pm 63. \quad (5)$$

where 2k, 2k+1 and 2k+2 indicate subcarrier 2k, 2k+1 and 2k+2, and H2k+i,0 is the interpolated channel estimate. $\overline{H}_{2k+2,0}$ is derived from a training symbol in a similar way as $\overline{H}_{2k,0}$.

For the IEEE 802.16a system, $\overline{H}_k$ for k≧101, and k≦−101 need not be computed because they are guard subcarriers, and no data is sent in these subcarriers (see Equation (2)).

Since a data packet typically contains more than one OFDM symbol, the channel estimator 216 may make use of decoded data symbols dec{$\overline{X}$} 224 to refine and update the channel estimates $\overline{H}$ 222 produced by the channel estimator 216. The channel estimator 216 may use adaptive filtering techniques, such as the Kalman filter, Least Mean Square (LMS), and exponential update, to update the channel estimates $\overline{H}$ 222 based on many observations (block 325).

The channel estimator 216 may use a decision by decision slicer 226 of received decoded data in a data packet to continuously update the channel estimate and thus improve performance.

The channel estimator 216 may use an optimal Kalman filter to update or refine the channel estimates. The channel update may be expressed as:

$$\overline{H}_{k,n+1} = \left(1 - \frac{1}{n}\right) \cdot \overline{H}_{k,n} + \frac{1}{n} \cdot \frac{\overline{Y}_{k,n}}{Dec(\overline{X}_{k,n})} \dagger \quad (6)$$

where $\overline{H}_{k,n}$ is the original channel estimate, "n" is a time index and indicates the nth time that channel estimates are refined/updated, (1-1/n) is an assigned weight, and 1/n is another assigned weight. As time increases, i.e., n=1, 2, 3, 4, etc., more weight is placed on $\overline{H}_{k,n}$ in equation (6). Equation (6) takes an average. $\overline{Y}_{k,n}$ is the received value or symbol for a particular kth received OFDM subcarrier. At each time n, the channel estimator 216 performs channel estimates for all k subcarriers that carry data (not guard and DC subcarriers, as described above). The decision slicer 226 receives $\overline{X}_{k,n}$ and may make a hard decision to decide which constellation point is closest to the received symbol $\overline{X}_{k,n}$. $Dec(\overline{X}_{k,n})$ is decoded data output from the decision slicer 226. $Dec(\overline{X}_{k,n})$ is the closest QAM constellation point to $\overline{X}_{k,n}$ from decision decoding by the decision slicer 226. $\overline{X}_{k,n}$ may be expressed as:

$$\overline{X}_{k,n} = \overline{Y}_{k,n} / \overline{H}_{k,n} \quad (7)$$

Thus, the channel estimator 216 makes an updated channel estimate based on the hard decision of the received packet.

Equation (6) may be used for interpolated subcarriers as well as un-interpolated subcarriers. Equation (6) may be used for IEEE 802.11a or 802.16a. More data symbols may further refine equation (6).

Instead of using a hard decision output, the channel estimator 216 may tolerate a delay and use a $Dec(\overline{X})$ output of a Viterbi decoder 236 to obtain channel estimate updates based on a sequence estimator instead of symbol-by-symbol or decision decoding.

The channel estimator 216 may use a least mean square (LMS) technique for channel updates, which may be computed by:

$$\overline{H}k, n+1 = \begin{cases} \overline{H}_{k,n} + 2\mu(\overline{Y}_{k,n} - \overline{H}_{k,n}Dec(\overline{X}_{k,n}))Dec(\overline{X^*_{k,n}}) & \text{for } P_k \neq 0 \\ \overline{H}_{k,n} + 2\mu_1(\overline{Y}_{k,n} - \overline{H}_{k,n}Dec(\overline{X}_{k,n}))Dec(\overline{X^*_{k,n}}) & \text{for } P_k = 0 \end{cases} \quad (8)$$

where $P_k \neq 0$ corresponds to the even subcarriers in equation (2), $P_k = 0$ corresponds to the odd subcarriers in equation (2)), and $\mu$ and $\mu_1$ are update coefficients for the LMS algorithm for the even (trained) and odd (interpolated) subcarriers respectively.

Another approach for channel updates is based on the hard-decision symbols computed from the demodulated symbols, i.e., a processed received symbol with the modulating carrier frequency and the effects of the channel removed. To compute channel updates based on the hard-decision symbols, the channel estimator 216 may use:

$$\overline{H}_{k,n+1} = \begin{cases} (1-\alpha) \cdot \overline{H}_{k,n} + \alpha \cdot \frac{\overline{Y}k,n}{Dec(\overline{X}_{k,n})} & \text{for } P_k \neq 0 \\ (1-\alpha_1) \cdot \overline{H}_{k,n} + \alpha \cdot \frac{\overline{Y}k,n}{Dec(\overline{X}_{k,n})} & \text{for } P_k = 0 \end{cases} \quad (9)$$

where $\alpha$ and $\alpha_1$ are adaptation coefficients with values between zero and one, and can be determined through simulations (e.g., table in FIG. 3). Different adaptation coefficients $\alpha$ and $\alpha_1$, and thus different updates, may be used for excited subcarriers when $P_k \neq 0$ and for non-excited subcarriers when $P_k = 0$. The adaptation coefficients $\alpha$ and $\alpha_1$ may be set to be a power of 2 to avoid using a multiplier or divider. This is an approximation to the optimal Kalman filter described above with equation (9). The computation in equation (9) is simpler than equation (6) because a divider is used for 1/n in equation (6), but not in equation (9). Even so, in a similar approach 1/n in equation (6) may be fixed to $2^{-3}$ and n=8. Similarly, $\alpha$ may be fixed to $2^{-3}$ in equation (9).

Figure 4:
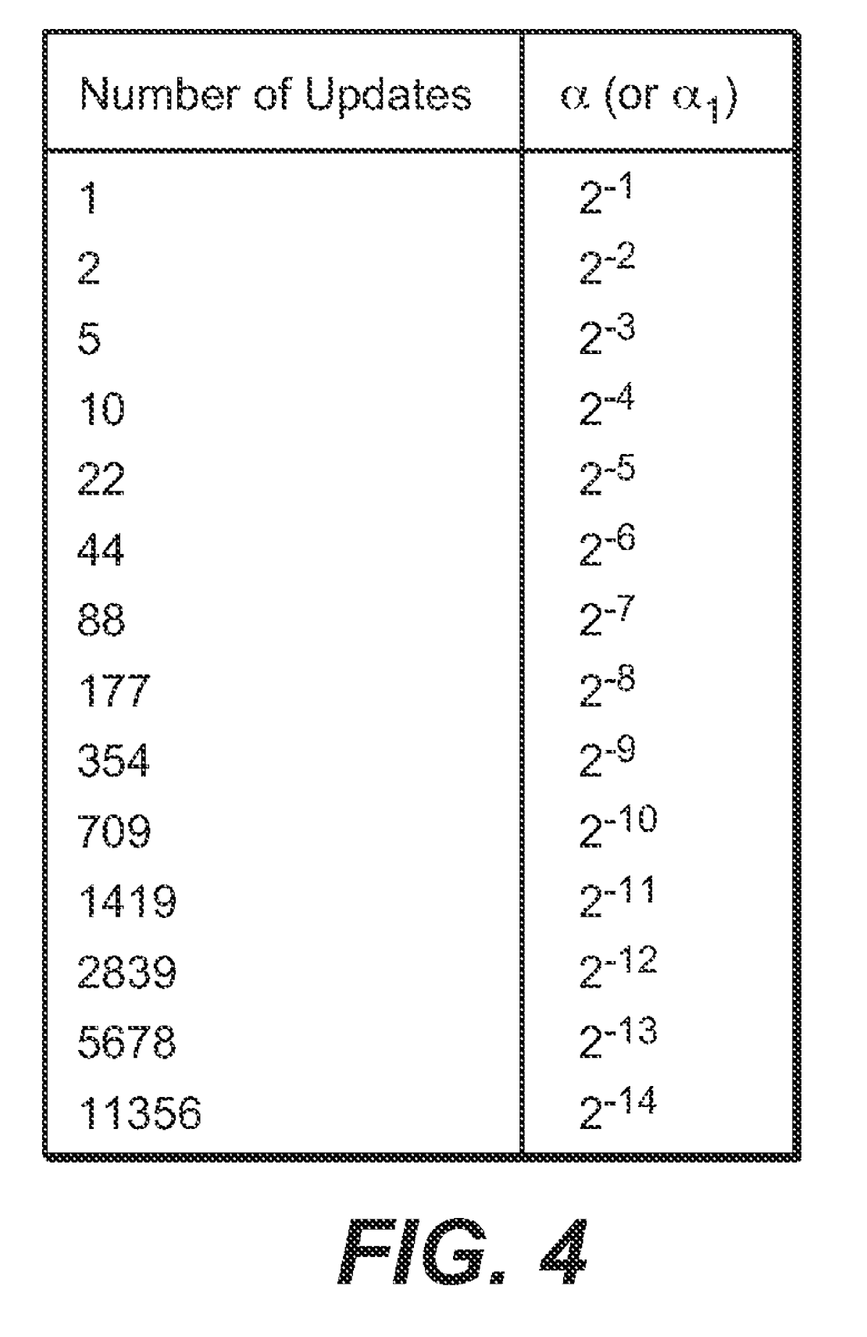
FIG. 4 shows a table of number of updates and adaptation coefficient settings to approximate an optimal Kalman filter, which may be used by the system of FIG. 2.

The adaptation coefficients $\alpha$ and $\alpha_1$ may also be adaptively changed according to the number of updates to provide better estimate updates. An optimal changing point may be stored in a table, as shown in FIG. 4. FIG. 4 shows a table of number of updates and adaptation coefficient settings to approximate an optimal Kalman filter. For example, if the channel estimator 216 is at the 2000th update, the update constant to be used is $\alpha = 2^{-11}$. The performance difference between the optimal Kalman filter and the described method is less than 0.2 dB in the noise variance of the channel estimate. An alternative choice is to choose a constant a for all the updates depending on the length of the packet.

The length of the packet is known at the beginning of the packet. This information can be used to pick an $\alpha$ to be used for all the updates such that some metric, such as bit error rate, is minimized. This method may perform worse than the previous method, but gives a better performance than choosing a fixed a for all packet lengths.

Since the interpolated channel estimates can limit the performance of the receiver, one may choose to adapt only the interpolated channel estimates (i.e., setting $\alpha = 0$) to further reduce the complexity. Depending on the channel condition and the SNR operating point, the optimal adaptation coefficients $\alpha$ and $\alpha_1$ can have different values. Furthermore, the optimal adaptation coefficients $\alpha$ and $\alpha_1$ can also be set differently for, for example, different modulation schemes, channelizations and packet sizes as this information is known at the receiver. The proposed channel adaptation update can also be applied to channel estimation in OFDM systems, such as the IEEE 802.11a/g systems, which do not require interpolation. In this case, the adaptation update can be performed after the initial channel estimates of all the data subcarriers.

In an alternative approach, a sequence estimator (symbol-by-symbol) or channel decoding may be used instead of hard-decision symbols.

Simulating the performance of using the proposed channel estimation technique shows that, for example, the decoder performance is about 1 dB away from the ideal case when the channel is known at the receiver for a rate-½ 16-QAM system in SUI (Stanford University Interim)-3 channels.

A number of embodiments have been described. Nevertheless, it will be understood that various modifications may be made without departing from the spirit and scope of the application. For example, the techniques above are implemented with IEEE 802.11a and 802.16a systems as examples. Other OFDM or non-OFDM systems and standards may be used with the techniques described above. The techniques may be applied to point-to-multiple-point systems and multiple-in-multiple-out (MIMO) systems. Accordingly, other embodiments are within the scope of the following claims.

The invention claimed is:

1. A method of obtaining channel estimates, the method comprising:

receiving, at a receiver, a preamble across a channel, the preamble comprising a first group of excited subcarriers and a second group of subcarriers being set to zero in a frequency domain, the preamble including two or more training sequences;
performing a Fourier transform of the training sequences;
deriving initial channel estimates in the frequency domain with the received preamble and a stored preamble;
receiving, at the receiver, data symbols across the channel;
demodulating and decoding the data symbols; and
updating the channel estimates using the demodulated and decoded data symbols.

2. The method of claim 1, wherein said updating the channel estimate comprises updating the channel estimate by performing operations on the demodulated and decoded data symbols, the operations excluding multiplication operations.

3. The method of claim 2, wherein the operations include addition and shift operations.

4. The method of claim 1, further comprising averaging the two or more training sequences of the received preamble.

5. The method of claim 4, wherein averaging the two training sequences may be expressed as:

$$\overline{P}_k = \frac{(\overline{P}_k + \overline{P}_{k+N/2})}{2} \text{ for } k = 0, 1, 2, \ldots, N/2 - 1, \text{ where } \overline{P}_k$$

represents a first received preamble sequence in the time domain, and $\overline{P}_{k+N/2}$ represents a second received preamble sequence.

6. The method of claim 1, wherein the channel is in an orthogonal frequency division multiplexing (OFDM) system.

7. The method of claim 1, wherein the received preamble comprises a pre-determined number of excited subcarriers and non-excited subcarriers.

8. The method of claim 7, wherein the received preamble comprises excited subcarriers for subcarriers k=+/−2, +/−4, ... +/−100.

9. The method of claim 7, further comprising interpolating the channel estimates for the non-excited subcarriers.

10. The method of claim 1, wherein the received preamble comprises an orthogonal frequency division multiplexing symbol, the received preamble comprising two or more training sequences in the time domain.

11. The method of claim 10, wherein the received preamble in a frequency domain is $$\overline{P}_k \begin{cases} \pm 1 & \text{for } k = \pm 2, \pm 4, \ldots \pm 100 \\ 0 & \text{for } k = 0, \pm 1, \pm 3, \ldots \pm 99, \pm 101, \pm 102, \ldots, \pm 127, -128 \end{cases}$$

where k is a subcarrier number.

12. The method of claim 1, further comprising using the two or more training sequences for correlation, wherein the two or more training sequences are identical.

13. The method of claim 1, wherein said demodulating yields $\overline{P}_k$ for k=0, +/−1, +/−2, ..., +/−63, −64.

14. The method of claim 1, further comprising linearly interpolating the channel estimates as expressed by $$\overline{H}_{2k+1,0} = \frac{(\overline{H}_{2k,0} + \overline{H}_{2k+2,0})}{2},$$

where $\overline{H}_k$ represents an estimated channel frequency response corresponding to a subcarrier k.

15. The method of claim 1, further comprising using decoded, decision data symbols to update the channel estimates.

16. The method of claim 1, further comprising using data symbols decoded using a Viterbi algorithm to update the channel estimates.

17. The method of claim 1, further comprising using Kalman adaptive filtering to update the channel estimates.

18. The method of claim 17, wherein a channel update may be expressed as $$\overline{H}_{k,n+1} = \left(1 - \frac{1}{n}\right) \cdot \overline{H}_{k,n} + \frac{1}{n} \cdot \frac{\overline{Y}_{k,n}}{Dec(\overline{X}_{k,n})},$$

where $\overline{H}_k$ represents an estimated channel frequency response corresponding to a subcarrier k.

19. The method of claim 17, further comprising making a hard decision of which constellation point is closest to a received subcarrier in order to update the channel estimates.

20. The method of claim 1, further comprising using a Least Mean Square adaptive filtering to update the channel estimates.

21. The method of claim 20, wherein a channel update is expressed as $$\overline{H}_{k,n+1} = \begin{cases} \overline{H}_{k,n} + 2\mu(\overline{Y}_{k,n} - \overline{H}_{k,n}Dec(\overline{X}_{k,n}))Dec(\overline{X}_{k,n}^*) & \text{for } P_k \neq 0 \\ \overline{H}_{k,n} + 2\mu_1(\overline{Y}_{k,n} - \overline{H}_{k,n}Dec(\overline{X}_{k,n}))Dec(\overline{X}_{k,n}^*) & \text{for } p_k = 0 \end{cases},$$

where $\overline{H}_k$ represents an estimated channel frequency response corresponding to a subcarrier k.

22. The method of claim 1, further comprising using an exponential update adaptive filtering to update the channel estimates.

23. The method of claim 1, wherein the method is performed in an IEEE 802.11a-compliant system.

24. The method of claim 1, wherein the method is performed in an IEEE 802.16a-compliant system.

25. A communication device comprising:
a receiver;
a Fourier transform module operable to perform a Fourier transform of two or more training sequences received in a preamble in a frequency domain, wherein the preamble comprises a first group of excited subcarriers and a second group of subcarriers being set to zero in the frequency domain;
a channel estimator operable to derive initial channel estimates in the frequency domain using the received preamble and a stored preamble;
a decoder to demodulate and decode received data symbols; and
an update module operative to update the channel estimate using the demodulated and decoded data symbols.

26. The communication device of claim 25, wherein the update module is operative to update the channel estimate by performing operations on the demodulated and decoded data symbols, the operations excluding multiplication operations.

27. The communication device of claim 26, wherein the operations include addition and shift operations.

28. The communication device of claim 25, further comprising an averaging module to average the two or more training sequences of the received preamble.

29. The communication device of claim 28, wherein averaging the two training sequences may be expressed as:

$$\overline{P}_k = \frac{(\overline{P}_k + \overline{P}_{k+N/2})}{2} \text{ for } k = 0, 1, 2, \ldots, N/2 - 1,$$

where $\overline{P}_k$ represents a first received preamble sequence in the time domain, and $\overline{P}_{k+N/2}$ represents a second received preamble sequence.

30. The communication device of claim 25, wherein the channel is an orthogonal frequency division multiplexing (OFDM) channel.

31. The communication device of claim 25, wherein the received preamble comprises a pre-determined number of excited subcarriers and non-excited subcarriers.

32. The communication device of claim 31, wherein the received preamble comprises excited subcarriers for subcarriers k=+/−2, +/−4, . . . +/−100.

33. The communication device of claim 31, wherein the channel estimator is operative to interpolate the channel estimates for the non-excited subcarriers.

34. The communication device of claim 25, wherein the received preamble includes an orthogonal frequency division multiplexing symbol, the received preamble comprising two or more training sequences in the time domain.

35. The communication device of claim 34, wherein the received preamble in a frequency domain is $$\overline{P}_k \begin{cases} \pm 1 & \text{for } k = \pm 2, \pm 4, \ldots \pm 100 \\ 0 & \text{for } k = 0, \pm 1, \pm 3, \ldots \pm 99, \pm 101, \pm 102, \ldots, \pm 127, -128 \end{cases}$$

where k is a subcarrier number.

36. The communication device of claim 25, wherein the channel estimator is operative to use the two or more training sequences for correlation, wherein the two or more training sequences are identical.

37. The communication device of claim 25, wherein said demodulating yields $\overline{P}_k$ for k=0, +/−1, +/−2, . . . , +/−63, −64.

38. The communication device of claim 25, wherein the channel estimator is operative to linearly interpolate the channel estimates as expressed by $$\overline{H}_{2k+1,0} = \frac{(\overline{H}_{2k,0} + \overline{H}_{2k+2,0})}{2},$$

where $\overline{H}_k$ represents an estimated channel frequency response corresponding to a subcarrier k.

39. The communication device of claim 25, wherein the update module is operative to update the channel estimates using decoded, decision data symbols.

40. The communication device of claim 25, wherein the update module is operative to update the channel estimate using data symbols decoded using a Viterbi algorithm.

41. The communication device of claim 25, wherein the update module is operative to update the channel estimate using Kalman adaptive filtering.

42. The communication device of claim 41, wherein a channel update may be expressed as $$\overline{H}_{k,n+1} = \left(1 - \frac{1}{n}\right) \cdot \overline{H}_{k,n} + \frac{1}{n} \cdot \frac{\overline{Y}_{k,n}}{Dec(\overline{X}_{k,n})},$$

where $\overline{H}_k$ represents an estimated channel frequency response corresponding to a subcarrier k.

43. The communication device of claim 41, wherein the update module is operative to make a hard decision of which constellation point is closest to a received subcarrier in order to update the channel estimates.

44. The communication device of claim 25, wherein the update module is operative to update the channel estimate using a Least Mean Square adaptive filtering.

45. The communication device of claim 44, wherein a channel update is expressed as $$\overline{H}_{k,n+1} = \begin{cases} \overline{H}_{k,n} + 2\mu(\overline{Y}_{k,n} - \overline{H}_{k,n}Dec(\overline{X}_{k,n}))Dec(\overline{X}_{k,n}^*) & \text{for } P_k \neq 0 \\ \overline{H}_{k,n} + 2\mu_1(\overline{Y}_{k,n} - \overline{H}_{k,n}Dec(\overline{X}_{k,n}))Dec(\overline{X}_{k,n}^*) & \text{for } P_k = 0 \end{cases},$$

where $\overline{H}_k$ represents an estimated channel frequency response corresponding to a subcarrier k.

46. The communication device of claim 25, wherein the update module is operative to update the channel estimate using an exponential update adaptive filtering.

47. The device of claim 25, wherein the method is performed in an IEEE 802.11a-compliant system.

48. The device of claim 25, wherein the method is performed in an IEEE 802.16a-compliant system.

49. A communication device comprising:
means for receiving preambles and data symbols;
means for performing a Fourier transform of two or more training sequences received in a preamble, the preamble comprising a first group of excited subcarriers and a second group of subcarriers being set to zero in a frequency domain;
means for deriving initial channel estimates in the frequency domain using the received preamble and a stored preamble;
means for demodulating and decoding received data symbols; and
means for updating the channel estimate using the demodulated and decoded data symbols.

50. The communication device of claim 49, further comprising means for updating the channel estimate by performing operations on the demodulated and decoded data symbols, the operations excluding multiplication operations.

51. The communication device of claim 50, wherein the operations include addition and shift operations.

52. The communication device of claim 49, further comprising means for averaging the two or more training sequences of the received preamble.

53. The communication device of claim 52, wherein averaging the two training sequences may be expressed as:

$$\overline{P}_k = \frac{(\overline{P}_k + \overline{P}_{k+N/2})}{2} \text{ for } k = 0, 1, 2, \ldots, N/2 - 1,$$

where $\overline{P}_k$ represents a first received preamble sequence in the time domain, and $\overline{P}_{k+N/2}$ represents a second received preamble sequence.

54. The communication device of claim 49, wherein the channel is an orthogonal frequency division multiplexing (OFDM) channel.

55. The communication device of claim 49, wherein the received preamble comprises a pre-determined number of excited subcarriers and non-excited subcarriers.

56. The communication device of claim 55, wherein the received preamble comprises excited subcarriers for subcarriers k=+/−2, +/−4, . . . +/−100.

57. The communication device of claim 55, further comprising means for interpolating the channel estimates for the non-excited subcarriers.

58. The communication device of claim 49, wherein the received preamble includes an orthogonal frequency division multiplexing symbol, the received preamble comprising two or more training sequences in the time domain.

59. The communication device of claim 58, wherein the received preamble in a frequency domain is $$\overline{P}_k \begin{cases} \pm 1 & \text{for } k = \pm 2, \pm 4, \ldots \pm 100 \\ 0 & \text{for } k = 0, \pm 1, \pm 3, \ldots \pm 99, \pm 101, \pm 102, \ldots, \pm 127, -128 \end{cases}$$

where k is a subcarrier number.

60. The communication device of claim 49, further comprising means for using the two or more training sequences for correlation, wherein the two or more training sequences are identical.

61. The communication device of claim 49, wherein said demodulating yields $\overline{P}k$ for k=0, +/−1, +/−2, . . . , +/−63, −64.

62. The communication device of claim 49, further comprising means for linearly interpolate the channel estimates as expressed by $$\overline{H}_{2k+1,0} = \frac{(\overline{H}_{2k,0} + \overline{H}_{2k+2,0})}{2},$$

where $\overline{H}_k$ represents an estimated channel frequency response corresponding to a subcarrier k.

63. The communication device of claim 49, further comprising means for updating the channel estimates using decoded, decision data symbols.

64. The communication device of claim 49, further comprising means for updating the channel estimate using data symbols decoded using a Viterbi algorithm.

65. The communication device of claim 49, further comprising means for updating the channel estimate using Kalman adaptive filtering.

66. The communication device of claim 65, wherein a channel update may be expressed as $$\overline{H}_{k,n+1} = \left(1 - \frac{1}{n}\right) \cdot \overline{H}_{k,n} + \frac{1}{n} \cdot \frac{\overline{Y}_{k,n}}{Dec(\overline{X}_{k,n})},$$

where $\overline{H}_k$ represents an estimated channel frequency response corresponding to a subcarrier k.

67. The communication device of claim 65, further comprising means for making a hard decision of which constellation point is closest to a received subcarrier in order to update the channel estimates.

68. The communication device of claim 49, further comprising means for updating the channel estimate using a Least Mean Square adaptive filtering.

69. The communication device of claim 68, wherein a channel update is expressed as $$\overline{H}_{k,n+1} = \begin{cases} \overline{H}_{k,n} + 2\mu(\overline{Y}_{k,n} - \overline{H}_{k,n}Dec(\overline{X}_{k,n}))Dec(\overline{X}^*_{k,n}) & \text{for } P_k \neq 0 \\ \overline{H}_{k,n} + 2\mu_1(\overline{Y}_{k,n} - \overline{H}_{k,n}Dec(\overline{X}_{k,n}))Dec(\overline{X}^*_{k,n}) & \text{for } P_k = 0 \end{cases},$$

where $\overline{H}_k$ represents an estimated channel frequency response corresponding to a subcarrier k.

70. The communication device of claim 49, further comprising means for updating the channel estimate using an exponential update adaptive filtering.

71. The device of claim 49, wherein the method is performed in an IEEE 802.11a-compliant system.

72. The device of claim 49, wherein the method is performed in an IEEE 802.16a-compliant system.

* * * * *